O. J. SIGLER & H. J. JARVIS.
PEAT EXPRESSER.
APPLICATION FILED SEPT. 5, 1911.

1,049,614.

Patented Jan. 7, 1913.

3 SHEETS—SHEET 1.

WITNESSES

INVENTORS

O. J. SIGLER & H. J. JARVIS.
PEAT EXPRESSER.
APPLICATION FILED SEPT. 5, 1911.

1,049,614.

Patented Jan. 7, 1913.
3 SHEETS—SHEET 2.

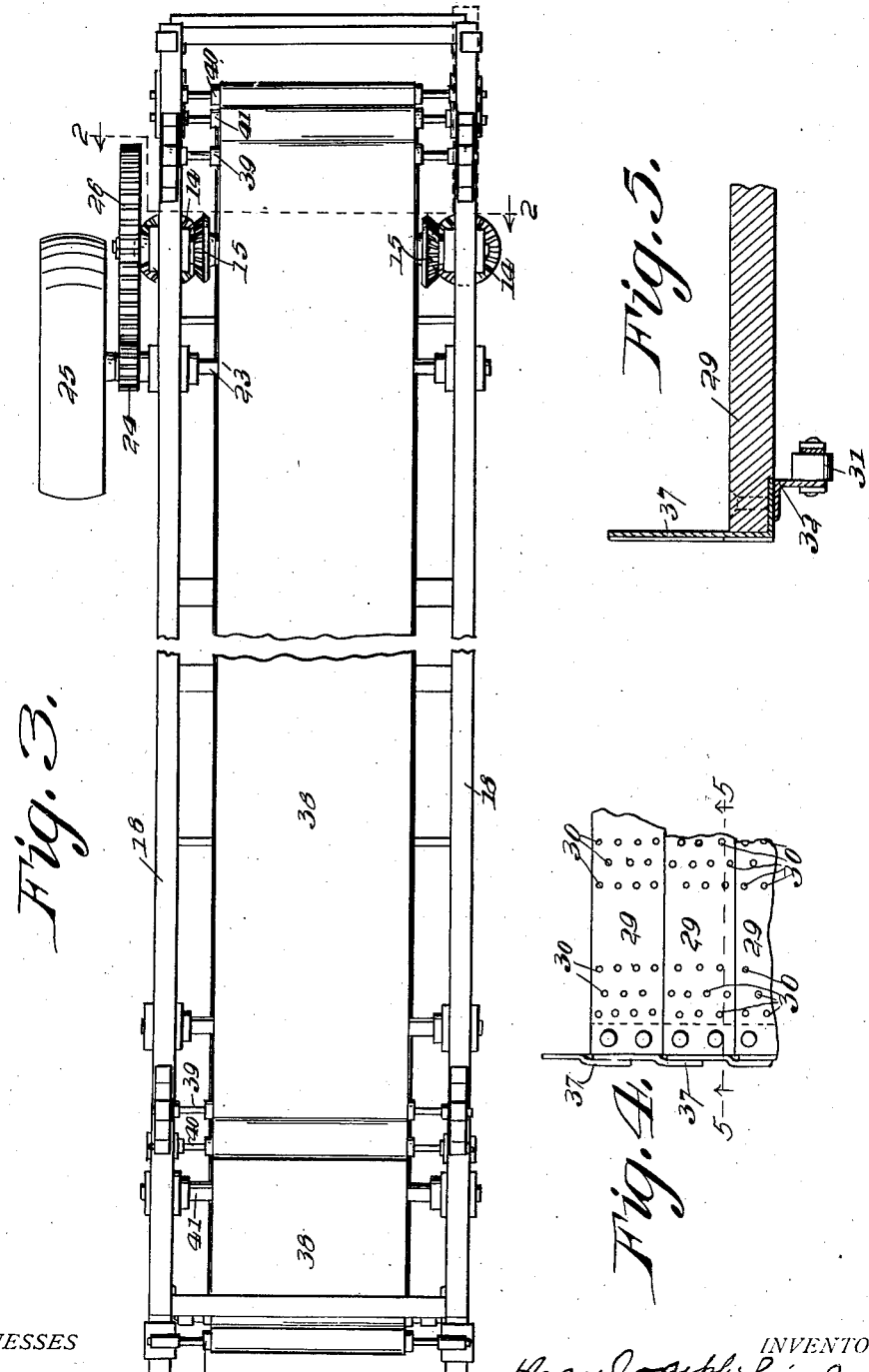

UNITED STATES PATENT OFFICE.

OSCAR JOSEPH SIGLER, OF MANSFIELD, AND HENRY JEROME JARVIS, OF TOLEDO, OHIO.

PEAT-EXPRESSER.

1,049,614.  Specification of Letters Patent.  Patented Jan. 7, 1913.

Application filed September 5, 1911. Serial No. 647,725.

*To all whom it may concern:*

Be it known that we, OSCAR JOSEPH SIGLER and HENRY JEROME JARVIS, citizens of the United States of America, residing, respectively, at Mansfield and Toledo, in the counties of Richland and Lucas and State of Ohio, have invented certain new and useful Improvements in Peat-Expressers, of which the following is a specification.

This invention relates to certain new and useful improvements in peat expressers, and the object of the invention is to provide an improved and simplified apparatus of this type in which the expressing operation may be effected with certainty of action.

Further and other objects will be later set forth.

Figure 1:
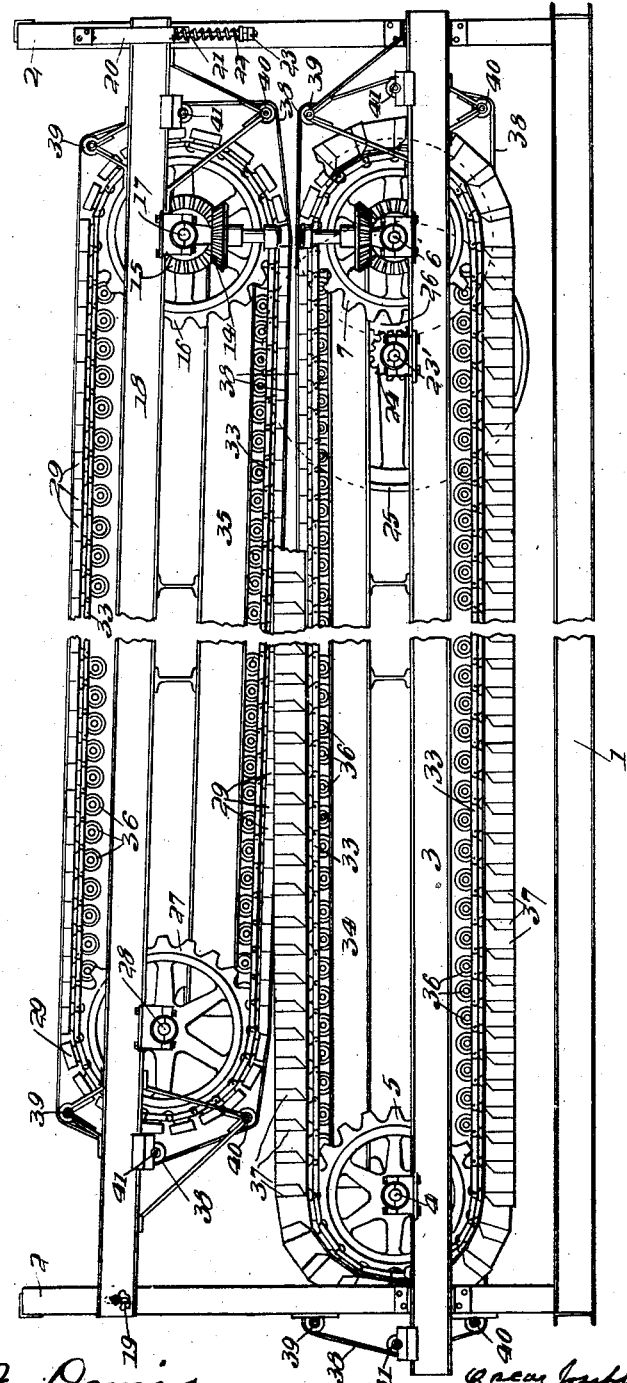
Figure 2:
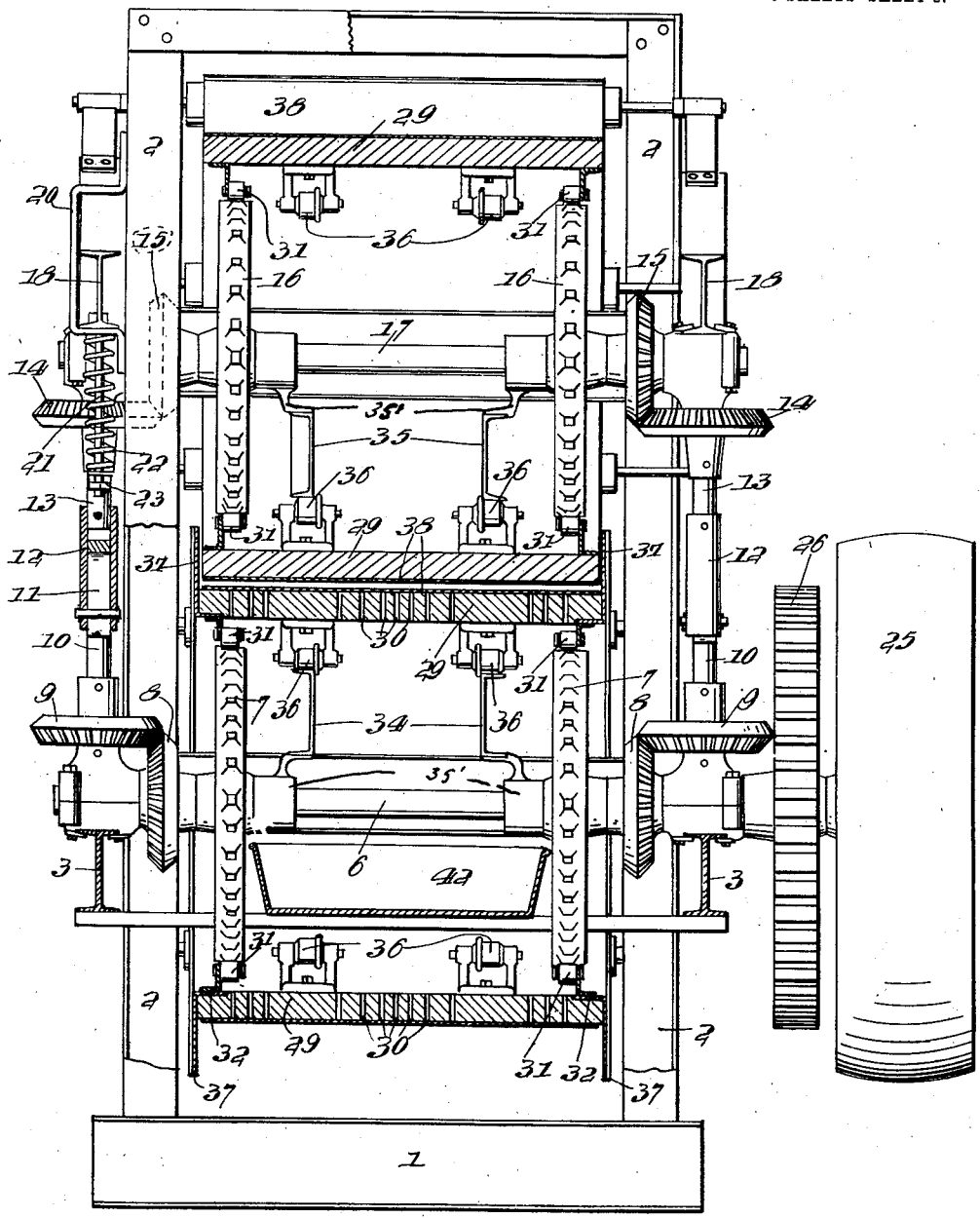

In the drawings: Figure 1, is a side elevation of the apparatus, Fig. 2, is an enlarged sectional view taken on the line 2—2 of Fig. 3, Fig. 3, is a top plan view, Fig. 4, is a fragmentary detail view of the flights and Fig. 5, is an enlarged sectional view taken on the line 5—5 of Fig. 4.

The apparatus includes a frame formed to have a base 1, and end uprights 2. Longitudinal I-beams 3, are rigidly connected to the uprights 2, and are located on opposite sides of the frame. A transverse shaft 4, is journaled in bearings that are carried by the beams 3, at the front end of the frame, and a pair of spaced toothed wheels 5, are rigidly mounted on said shaft. A transverse shaft 6 at the rear end of the frame is journaled in bearings that are carried by beams 3, and a pair of spaced toothed wheels 7, are rigidly mounted on said shaft 6. Miter gears 8 are keyed to shaft 6, and mesh with similar gears 9, that are rigidly secured to the lower ends of shafts 10, the latter having squared portions 11, which project into sleeves 12, the latter being slidable on the squared portions 11. The upper ends of the sleeves 12, are rigidly secured to shafts 13, which have the miter gears 14, rigidly secured thereto, said gears 14, being in mesh with miter gears 15, that are carried by a transverse shaft 17. A pair of spaced toothed wheels 16 are rigidly affixed to shaft 17. The shaft 17 is journaled in bearings that are carried by upper longitudinal beams 18, the latter being mounted by means of the bolt and slot connection 19, so that the beams 18 have an adjustable pivotal connection at their front ends. The rear ends of the beams 18, slide in guides provided by the brackets 20. Each beam 18 has a rigid depending rod 21, affixed thereto, which is encircled by coil spring 22, the latter abutting the bracket 20 and a nut 23, on rod 21. Due to the presence of the springs the free rear ends of the beams will have a yielding action and will normally be drawn downwardly, the beams having the aforementioned pivotal connection 19 at their front ends.

A drive shaft 23, has a pinion 24, and a pulley 25 rigid thereon, the pinion meshing with a gear wheel 26. Any suitable belt may connect with pulley 25, to drive the same.

Toothed wheels 27 are rigidly secured to a shaft 28, that is journaled in bearings carried adjacent the front end of beams 18.

The expressing mechanism proper includes an upper and a lower endless platform, the upper platform being of less length and width than the lower platform. Each platform consists of a series of transverse strips or flights 29 made of wood, the flights of the lower platform being perforated as indicated at 30. Rollers 31, revolubly mounted on L-shaped brackets 32, are rigidly connected to the flights 29, on the inner faces of the latter, so that the rollers will engage the toothed wheels 5 and 7 and 27 and 16. The flights are connected at their ends by means of chains 33. A pair of spaced stationary lower beams 34 are provided, and upper stationary beams 35, are likewise provided, these beams 34 and 35, being secured on brackets 35[1] mounted on the shafts 6 and 17, respectively, and are for engagement with anti-friction rollers 36, that are carried by the inner faces of the two platforms.

The lower platform is provided on opposite sides with overlapping pivoted side plates 37 which are secured to the individual flights thereof and which receive the upper platform therebetween, as depicted in Fig. 2 of the drawings.

The pairs of beams 34 and 35 provide pressure rails, that is to say when the antifriction rollers 36, engage said rails, as shown in Fig. 2, they will limit the movement of the confronting portions of the platforms and will act as abutments which hold the platforms to their work, effecting the expressing action on the material, in an obvious manner.

Both plaforms have their confronting portions covered with a suitable fabric, or cloth and the liquid is forced through the foraminous lower platform by the upper platform. The cloth designated 38, is endless and passes around upper end rollers 39, lower rollers 40, and intermediate rollers 41. The endless bands of cloth are driven by friction existing between the same and the material which is being carried along, during the expressing thereof, by the upper and lower platforms.

From the above it will be seen that the liquid is forced through the cloth of the lower platform by virtue of the pressure exerted by the upper platform, and that the upper platform is capable of having a yielding up and down movement, due to the pivotal mounting of the beams 18 which support the upper platform. It will further be seen that the endless bands of cloth by reason of being mounted on the rollers shown and described, will not interfere with the free movement of the platforms. The solid matter remaining at the completion of the expressing operation is delivered at the rear end of the apparatus and the liquid drops into a pan 42 that is secured on the interior of the lower of the platforms and is supported by the frame in any suitable manner. The plates 37 provide side walls which are located on opposite sides of the lower platform, preventing the solid matter from escaping in an obvious manner. The cloth further serves the purpose of preventing the solids from adhering to the platforms and further covers the interstices between the individual flights.

In operation the material is placed in the front end of the apparatus between the platforms, and as the confronting faces of the platforms are forced toward one another by reason of the rollers 36 of the platforms traveling on the tracks 34 and 35, the material will be subjected to the pressure exerted by the platforms, and the liquid will be expressed from the solid matter and will drop into the pan. It will be understood that power imparted to the pulley 25 will drive the shaft 23 and therewith gear 24, the latter rotating gear 26 and therewith shaft 6, which will cause rotation of the toothed wheels 7 and thereby effect movement of the lower platform. The rotation of shaft 6 will cause rotation of the miter gears 8, and the latter by virtue of being in mesh with the miter gears 9 will drive the gears 14 and therewith the gears 15 of shaft 17, effecting movement of the upper platform by reason of the toothed wheels 16 being carried by the shaft 17. Owing to the sliding connection between the shaft 10 and the sleeve 12 of shaft 13, the beams 18 are capable of rising and falling movement without disturbing the operation of the upper platform, in an obvious manner.

What is claimed is:

1. In a peat expresser, a frame including end uprights, a longitudinal beam on each side of the frame pivoted at one end to the adjacent upright, a guide for the opposite end of each beam carried by the uprights at the opposite end of the frame to permit the last named ends of the beams to reciprocate vertically in the guide, a rod depending from each of said last named ends of the beams, a spring encircling each rod and abutting the guides at one end of the latter, projections on the lower ends of the rods to support the lower ends of the springs, an upper endless platform supported between the ends of the beams, a lower endless platform carried by the frame, a gear for actuating each platform, and an extensible and contractile shaft connection between said gears having gears on its ends for mesh with the gears of the platforms.

2. In a peat expresser, an upper and a lower endless platform, a series of plates secured to the lower platform on opposite sides of the latter, said plates overlapping each other throughout all of the movements of the lower platform and forming liquid-tight walls which prevent liquid from escaping through said walls, the lower portion of the upper platform being received in the space between said walls.

3. In a peat expresser, a frame including end uprights, a longitudinal beam on each side of the frame pivoted at one end to the adjacent upright, a guide for the opposite end of each beam carried by the uprights at the opposite end of the frame to permit the last named ends of the beams to reciprocate vertically, spring means to normally hold the last named ends of the beams at the limit of their downward movement, an upper endless platform carried by the beams, an endless lower platform carried by the frame, a gear for operating each platform, and a telescopic shaft having a gear at each end for engagement with the platform gears.

4. In a peat expresser, a frame, an upper and a lower endless platform carried by the frame, a pair of shafts having wheels thereon for supporting each platform, a pair of brackets carried by each shaft, the brackets of the upper shafts extending downwardly and the brackets of the lower shafts extending upwardly, beams carried by the brackets, and rollers on the platforms to engage said beams.

In testimony whereof we affix our signatures in presence of two witnesses.

OSCAR JOSEPH SIGLER.
HENRY JEROME JARVIS.

Witnesses:
PEARL M. ACHERMAN,
JOHN H. COSS.